Jan. 15, 1929.

M. M. CLAYTON 1,699,280

OUTLET BOX CONNECTER

Filed June 7, 1926

WITNESSES

INVENTOR

Patented Jan. 15, 1929.

1,699,280

UNITED STATES PATENT OFFICE.

MARTIN M. CLAYTON, OF BADEN, PENNSYLVANIA, ASSIGNOR TO NATIONAL METAL MOLDING COMPANY, A CORPORATION OF PENNSYLVANIA.

OUTLET-BOX CONNECTER.

Application filed June 7, 1926. Serial No. 114,101.

It is the object of the invention to provide a connecter for securing electrical cables and conduits in the openings of outlet boxes and like electrical fittings, which will be both simple and effective. In the particular embodiment of the invention shown in the accompanying drawings the connecter comprises an integral structure, which may either be a casting or made of fabricated sheet metal, and a movable member located within the box and cooperating with the box wall to lock the connecter, cable and box tightly together.

Figure 1:
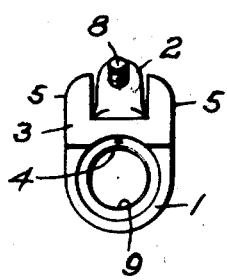
Figure 2:
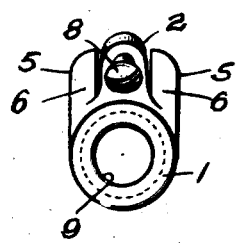
Figure 3:
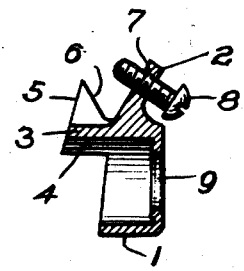
Figure 4:
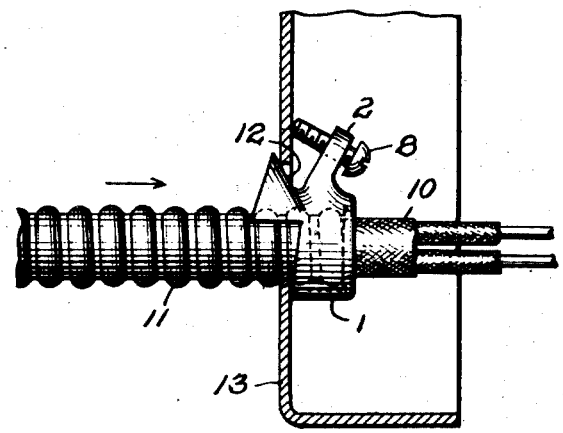

In the accompanying drawings Figure 1 is a front elevation of the connecter looking in the direction of the arrow on Figure 4. Figure 2 is a rear elevation. Figure 3 is a vertical section. Figure 4 is a view in elevation showing the connecter and cable secured in an opening in the back wall of an outlet box, the box wall being shown in section.

The connecter in the preferred embodiment shown comprises an inner sleeve or bushing 1 having a rearwardly inclined ear 2, and an outwardly projecting sector 3 having an arcuate inner face 4 in continuation of the inner wall of the sleeve, and a pair of upwardly projecting lugs 5 having inclined inner faces 6 arranged on opposite sides of the line of the ear 2. The ear 2 has a threaded perforation 7 through which projects the screw 8 in such position that its point may be forced into binding contact with the inner face of the wall of the box. As is customary, the inner edge of the sleeve 1 is turned inwardly to form a bushing 9 for the unsheathed conductors 10 and an abutment for the edge of the cut-away armor 11 when armored cable is being used.

In practice the sector 3 and lugs 5 will be hooked outwardly through the outlet opening 12 of the box 13, and the end of the cable will be passed through the opening and the connecter as shown. The screw 8 inside the box will then be turned and its point forced into tight binding contact with the inside face of the box wall, thus forcing the connecter downwardly or away from the adjacent portion of the edge of the outlet opening, and causing the upper face of the bore of the sleeve and the inner face 4 of the sector to bind upon the cable and to pinch the cable into tight engagement with the lower or opposite edge of the outlet opening, while at the same time the upper edge of the outlet opening will be wedged against the inclined surfaces 6 of the lugs 5, and the cable, connecter and box will be locked tightly together, as shown in Figure 4.

It is believed to be characteristic of the invention that at one side of the outlet opening the connecter is wedgingly gripped to the box wall, and by such wedge-gripping action the body of the connecter is caused to clamp the cable against the edge of the outlet opening at the opposite side. It is preferred that the movable gripping member be located inside the box, though that is not essential. And it will be obvious that the connecter may be considerably modified in form and details of construction and still embody the invention.

I claim as my invention:

1. The combination with an outlet-box having an opening through its wall, of a connecter located in said opening and adapted to receive a cable leaving a portion of said opening exposed to the cable, said connecter having at the unexposed side of said opening a wedge-member in contact with the edge of the opening on one face of the box wall, and a movable member mounted on the connecter adapted to make contact with the opposite face of the box wall and force said wedge-member against said edge, said members thereby cooperating through their wedge grip upon the box wall to cause the connecter to clamp the cable against the opposite exposed edge of said opening.

2. A connecter comprising a member including a portion of suitable size to fit into a box hole and formed to expose a part of the box hole edge, a nose raised on the portion to slide against a box hole edge and force the connecter laterally, and operating means mounted on the connecter spaced from the nose to bear against a box wall and react therefrom to forcibly slide the nose against a box hole edge.

3. A connecter comprising a sleeve including a portion of suitable size to fit into a box hole and formed to expose a part of the box hole edge, a nose including an incline raised on the portion to slide against a box hole edge and force the connecter laterally, and a screw threaded through and carried with the connecter spaced from and pointing toward the incline of the nose to bear on and react from a box to forcibly slide the nose against a box hole edge.

In testimony whereof I have hereunto set my hand.

MARTIN M. CLAYTON.